March 1, 1966 E. E. COOK Re. 25,973

END PORTED ROLLER PUMP

Original Filed May 24, 1962

INVENTOR.
ERNEST E. COOK
BY Meyers & Peterson
ATTORNEYS

United States Patent Office

Re. 25,973
Reissued Mar. 1, 1966

25,973

END PORTED ROLLER PUMP

Ernest E. Cook, Anoka, Minn., assignor, by mesne assignments, to Hypro, Inc., Minneapolis, Minn., a corporation of Ohio Original No. 3,119,345, dated Jan. 28, 1964, Ser. No. 197,318, May 24, 1962. Application for reissue Sept. 3, 1965, Ser. No. 487,104
4 Claims. (Cl. 103—136)

Matter enclosed in heavy brackets [ ] appears in the original patent but forms no part of this reissue specification; matter printed in italics indicates the additions made by reissue.

This invention relates to rotary pumps and more particularly to rotary pumps of the type which employ free-floating roller elements.

It is an important object of the invention to provide a pump of the class described which has a high capacity for its size and is efficient and economical, both in manufacture and in operation.

Another object of the invention is to provide a rotor and roller assemblage which maintains a fluid piston in connection with each of the rollers so as to increase the efficiency of fluid flow under high speed and to reduce the noise and wear within the pump.

A still further object of the invention is to provide an end porting arrangement such that fluid flow is established in parallel relation both above and below the rollers with each roller maintained against endwise displacement.

These and other objects and advantages of this invention will more fully appear from the following description, made in connection with the accompanying drawing, wherein like reference characters refer to the same or similar parts throughout the several views and in which.

Figure 1:
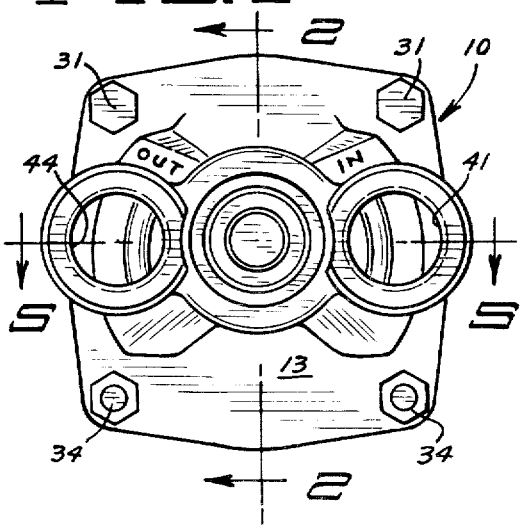
FIGURE 1 is an end elevation looking in the direction of the inlet and outlet.

With continued reference to the drawing, the invention generally comprises a housing 10 and a rotor assemblage 11 journaled therein. The elements are so arranged that the pump is driven from the right as shown in FIGURE 2 and all of the fluid flow is substantially axial to the rotor and occurs through porting disclosed to the left as shown in the same view.

The housing 10 may be conveniently formed in two main portions such that a cup-shaped body 12 constitutes one part and the ported end plate 13 constitutes the other. A cylindrical pumping chamber 14 is defined by an inner circumferential wall 15 and a circular end wall 16 as best shown in FIGURES 2 and 3. The cup-shaped body 12 is further provided with a boss 17 having a cavity 18 formed therein. A shaft opening 19 is formed through end wall 16 and centered with respect to the cavity 18. A sealed roller bearing assemblage 20 is fitted in cavity 18 so as to lie against a shouldered portion 21 of the cavity and a shaft seal 22 also lies within the cavity 18 in inwardly spaced relation to the bearing assembly 20. A weep hole extends vertically downward at 23 so as to pass through the boss 17 and permit fluid which may have passed the seal to drip outwardly from between the bearing assembly 20 and shaft seal 22. In the end wall 16 is formed a shallow cavity 24 as shown in FIGURE 3 and this cavity communicates with a small passageway 25 which leads to the space 26 which exists between the end wall 16 and the shaft seal 22. Thus, any fluid which escapes through the shaft opening 19 and into the space 26 will be subjected to a reduced pressure resulting from the communication through passageway 25 with the suction or inlet side of the pump.

Figure 2:
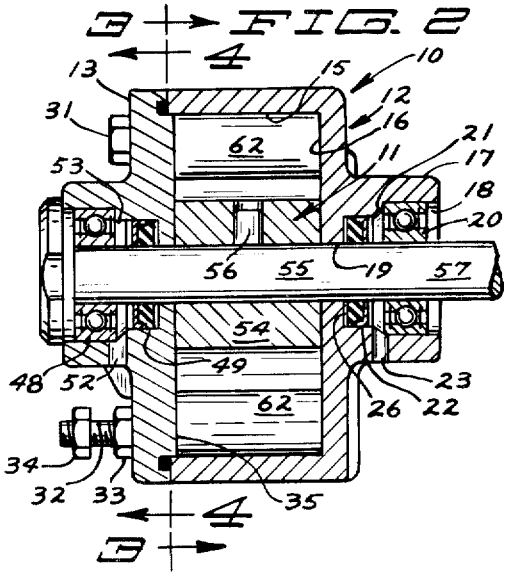
FIGURE 2 is a vertical section of the pump taken on the line 2—2 of FIGURE 1.
Figure 3:
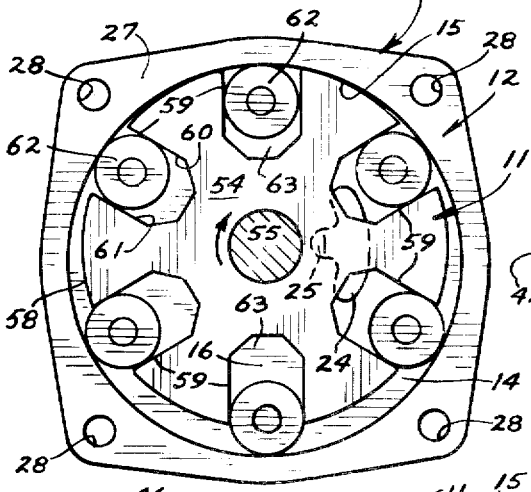
FIGURE 3 is another section taken on the line 3—3 of FIGURE 2 and looking in the direction of the arrows.

It will be observed from FIGURES 2 and 3 that, while the cylindrical pumping chamber is circular in configuration, the shaft opening 19 is somewhat above the true center axis of the pumping chamber.

The outer edge of the cup-shaped body 12 terminates in a planar flange 27 having a plurality of tapped openings 28 formed therein. The other principal portion of the housing 10 is the end plate 13 which has a flange area 29 lying in a single plane and adapted to interfit over the planar area 27 of the cup-shaped body 12. The end plate 13 is also provided with openings 30 which register with the tapped openings 28 of the cup-shaped body and may be provided with cap screws 31 or studs 32 with set nuts 33 and retaining nuts 34 as shown in FIGURE 2, the stud assemblages serving both to maintain the end plate 13 fastened in the housing and to provide means for convenient mounting of the entire pump to an external mounting structure (not shown). An end wall 35 is also formed on end plate 13 and this end wall may be slightly raised, except for the marginal relief areas 36, from the plane of the flange 29. Marginal relief areas 36 permit complete operability of the rollers out to the circumference 15, and guard against entrapment of any portion of the pumped fluid. End wall 35 lies in spaced parallel relation to the end wall 16 and defines the width of the cylindrical pumping chamber previously referred to. A partially recessed ring 37 is disposed between the juncture of end wall 35 and flange 29 and serves to seal the juncture between the end plate and the cup-shaped body.

Figure 4:
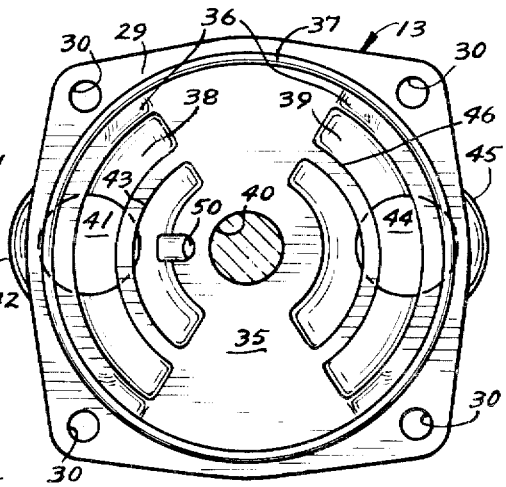
FIGURE 4 is a view of the inside of the end plate showing the ports and inlet and outlet, the view being taken on the line 4—4 of FIGURE 2.
Figure 5:
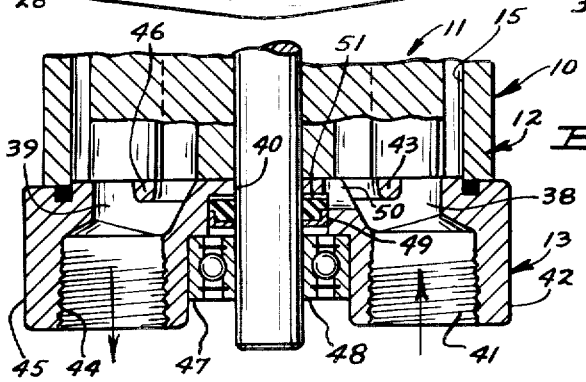
FIGURE 5 is a fragmentary view of the porting end of the pump in enlarged horizontal section taken on the line 5—5 of FIGURE 1.

Formed in the end plate 13 is an inlet port 38 and an outlet port 39 as shown in FIGURE 5. The inlet port cavity 38 is formed arcuately about the axis of shaft opening 40 shown in FIGURE 4. Shaft opening 40 is in alignment with the shaft opening 19 and also lies vertically above the true axial center of the cylinder pumping chamber as defined by circumferential walls 15 when the end plate is in place. Inlet port 38 communicates with the inlet 41 which in turn is formed in boss 42 as an integral fixture of the pump. An elongated rib 43 runs arcuately for the length of the inlet port 38 and lies in the same plane as the remainder of the end wall 35.

Diametrically opposite from the inlet port 38 is the outlet port 39 which in turn communicates with outlet 44 threadedly formed in boss 45 which, like boss 42, is integral with the end plate 13 and provides a fitting connection. An elongated rib 46 extends arcuately for the length of the outlet port 39, like its counterpart rib 43, lies in the same plane with the remainder of the end wall 35 as shown in FIGURES 4 and 5.

Shaft opening 40 in the end plate 13 communicates with shouldered cavity 47 which in turn retains the bearing assemblage 48 and the shaft seal 49 as best seen in FIGURE 5. A passageway 50 passes through the end wall 35 of end plate 13 and communicates with the space 51 which lies between the seal ring 49 and the end plate 13 as shown in FIGURE 5. It will be noted that passageway 50 also communicates with the suction or inlet side of the pump so that a reduced pressure is exerted on the space 51, thereby removing any liquid which may lie inwardly of the seal 49. Referring to FIGURE 2, it will be seen that a drainage or weep hole 52 is provided through the end plate so as to extend downwardly from the space 53 which occurs between bearing assemblage 48 and the shaft seal 49.

The pump rotor 11 has a rotor body 54 of circular shape which in turn is mounted upon shaft 55 and secured thereto by such means as set screw 56. Shaft 55 is journaled through the bearing assemblages 20 and 48 as well as through the housing openings and seals previously described. The shaft extends outwardly of the pump housing in an extension 57 which may be coupled to a power source of suitable character. The circumference 58 of the rotor 54 as previously noted is concentric with the axis of shaft 55 and is eccentric with respect to the cylindrical inner surface 15 of the pumping chamber. The upper portion of the circumferential surface 58 is almost in contact with the wall 15 as shown in FIGURE 3 while the lower portion is substantially spaced therefrom and defines positive pumping spaces, the volume of which changes as the rotor body 54 rotates.

Formed across the rotor body 54 and extending radially inward are a plurality of roller receiving slots 59 as shown in FIGURE 3. Each of these slots has a leading face 60 and a trailing face 61 which confront one another in spaced parallel relation. A cylindrical roller element 62 lies within each of the slots 59 and is movable inwardly and outwardly within each slot. An important feature of the invention resides in the depth of the slot which provides a substantial clearance 63 inwardly of the roller 62, even when it has been depressed radially to its fullest extent as exhibited by the uppermost roller in FIGURE 3. When each of the rollers 62 reaches the lowermost position, the space 63 is increased and the roller actually extends somewhat beyond the outer circumference 58 of the rotor body 54.

In the use and operation of the invention, the rotor body 54 lies in sliding contact with the end walls 35 and 16 as shown in FIGURE 2 and the shaft 55 together with the rotor body 54 rotates in a clockwise direction as viewed in FIGURE 3. The rollers 62 are thrown outwardly by centrifugal force so as to ride against the inner circumferential surface 15 and also to slide against the trailing surface 61 of each of the slots 59. The clearance between each roller 62 and the leading surface 60 is very small to prevent passage of fluid from the area 63 beneath the roller. As each roller moves with the rotor 54, it maintains contact with the circumferential surface 15 at the inside of the cup-shaped housing body and begins to move outwardly in its slot 59 as the outer circumference of the rotor leaves the inner housing surface. The rollers 62 also lightly contact the end wall surfaces 16 and 35 and as the rollers continue over the inlet port 38, the expanding space 63 causes fluid to be pulled in from inlet 41 to occupy the space beneath each roller. Also, it will be noted that the space outwardly of the rotor body and between consecutive rollers begins to increase and likewise exerts a pulling force on the fluid in the inlet port 38. Since the rib 43 is arcuate and continuous for the length of the inlet port 38, each roller 62 is maintained in proper lateral position as it passes thereover.

As previously noted, the small passageway 50 connects with the inlet port and exerts a suction force upon the space between the end wall 35 and the shaft seal 49. Any liquid trapped in the space is thus pulled back into the rotor and is intermixed with the pumped fluid. The inlet port 38 terminates short of the maximum throw of each roller and hence there is no further intake of fluid from the inlet 41 through port 38. However, as the roller 62 continues in its travel in a clockwise direction as viewed in FIGURE 3, the space between the rotor body 64 and the inner circumferential surface 15 begins to diminish. Shortly thereafter it reaches the lower end of the outlet port 39 and again the roller 62 rides upon a rib member 46 to prevent endwise displacement. The liquid which was pulled into the slot 59 in the space 63 is now caused to move laterally outward and be discharged through the outlet port 39. In a similar manner, the liquid forwardly of the roller 62 is caused to be squeezed into the outlet port 39. The ports are thus self-valving in character and the consecutive increasing and diminishing volumes associated with each roller cause a continuous flow of liquid into the inlet 40 and out of the outlet 44. Since the small passageway 25 also lies at the inlet side of the pump, the previously noted evacuating effect will be exerted on fluid which may become entrapped between the end wall 16 and shaft seal 26.

Each of the slot elements 59 is so dimensioned as to create a reservoir or fluid piston which is constantly maintained in the space 63. This reservoir effectively permits a simultaneous movement of the rollers at both ends outwardly in contact with the inner circumferential surface 15 despite the fact that the fluid flow is endwise of the rotor.

The average distance travelled by incoming fluid and outgoing fluid is less than when no reservoir is employed. The reservoir space 63 thus effectively decreases the average velocity of the pumped fluid and undesirable forces which tend to move the rollers out of their parallel relation with the rotor axis are minimized. It will also be noted that liquid is pulled in from the inlet 41 directly into the rotor without negotiating change of direction and flow. Similarly, the fluid is pumped in a reverse direction without change of direction directly into the outlet 44.

The noted arrangement makes it possible for both the inlet and outlet to be located at one side of the rotor and to be aligned in close parallel relation with the rotor shaft and with each other.

It will, of course, be understood that various changes may be made in the form, details, arrangements and proportions of the parts without departing from the scope of this invention as set forth in the appended claims.

What is claimed is:

1. A fluid pump comprising:

(a) a housing having a cylindrical pumping chamber therein, (b) said pumping chamber being defined by an inner circumferential wall and a pair of spaced circular end walls;

(c) a rotor rotatably mounted within said pumping chamber and having its axis in offset parallel relation to that of said pumping chamber and having a width such as to extend from one of said circular end walls to the other, (d) said rotor having a plurality of roller receiving slots having a leading face and a trailing face confronting one another in spaced parallel relation formed into and extending throughout the entire width of said rotor;

(e) a roller disposed for free rotation in each of said slots extending from one of said circular end walls to the other and having a diameter substantially equal to the distance between said parallel leading and trailing faces so that there is an effective sealing clearance with said faces at all times;

(f) the radial depth of said slots being substantially greater than the diameter of said rollers so that a substantial clearance forming an effective fluid reservoir will continually be maintained inwardly of each roller even when each of said rollers is in its inwardmost position;

(g) a generally arcuate inlet port formed through one of said circular end walls, and (h) a generally arcuate outlet port formed through the same circular end wall, said arcuate inlet and outlet ports being diametrically opposed and positioned so as to communicate with said slots during rotation of said rotor.

2. A fluid pump comprising:

(a) a housing having a cylindrical pumping chamber therein;

(b) said pumping chamber being defined by an inner circumferential wall and a pair of spaced circular end walls;

(c) a rotor rotatably mounted within said pumping chamber and having its axis in offset parallel relation to that of said pumping chamber and having a width such as to extend from one of said circular end walls to the other;

(d) said rotor having a plurality of roller receiving slots having a leading face and a trailing face confronting one another in spaced parallel relation formed into and extending throughout the entire width of said rotor;

(e) a roller disposed for free rotation in each of said slots extending from one of said circular end walls to the other and having a diameter substantially equal to the distance between said parallel leading and trailing faces so that there is an effective sealing clearance with said faces at all times;

(f) the radial depth of said slots being substantially greater than the diameter of said rollers so that a substantial clearance forming an effective fluid reservoir will continually be maintained inwardly of each roller even when each of said rollers is in its inwardmost position;

(g) a generally arcuate inlet port formed through one of said circular end walls;

(h) a generally arcuate outlet port formed through the same circular end wall, said arcuate inlet and outlet ports being diametrically opposed and positioned so as to communicate with said slots during rotation of said rotor, and (i) a longitudinal rib dividing each of said inlet and outlet ports into two portions and lying in the same plane of said one circular end wall, said inlet and outlet ports and their respective ribs being positioned so as to communicate with said slots and to provide restraint against lateral displacement of said rollers.

*3. A fluid pump comprising:*

*(a) a housing having a cylindrical pumping chamber therein,*

*(b) said pumping chamber being defined by an inner circumferential wall and a pair of spaced circular end walls;*

*(c) a rotor rotatably mounted within said pumping chamber and having its axis in offset parallel relation to that of said pumping chamber and having a width such as to extend from one of said circular end walls to the other,*

*(d) said rotor having a plurality of roller receiving slots having a leading face and a trailing face confronting one another in spaced parallel relation formed into and extending throughout the entire width of said rotor;*

*(e) a roller disposed for free rotation in each of said slots extending from one of said circular end walls to the other and having a diameter substantially equal to the distance between said parallel leading and trailing faces so that there is an effective sealing clearance with said faces at all times;*

*(f) the radial depth of said slots being substantially greater than the diameter of said rollers so that a substantial clearance forming an effective fluid reservoir will continually be maintained inwardly of each roller even when each of said rollers is in its inwardmost position;*

*(g) a generally arcuate inlet port formed through one of said circular end walls, and*

*(h) a generally arcuate outlet port formed through one of said circular end walls, said arcuate inlet and outlet ports being diametrically opposed and positioned so as to communicate with said slots during rotation of said rotor.*

*4. A fluid pump comprising:*

*(a) a housing having a cylindrical pumping chamber therein,*

*(b) said pumping chamber being defined by an inner circumferential wall and a pair of spaced circular end walls;*

*(c) a rotor rotatably mounted within said pumping chamber and having its axis in offset parallel relation to that of said pumping chamber and having a width such as to extend from one of said circular end walls to the other,*

*(d) said rotor having a plurality of roller receiving slots having a leading face and a trailing face confronting one another in spaced parallel relation formed into and extending throughout the entire width of said rotor;*

*(e) a roller disposed for free rotation in each of said slots extending from one of said circular end walls to the other and having a diameter substantially equal to the distance between said parallel leading and trailing faces so that there is an effective sealing clearance with said faces at all times;*

*(f) the radial depth of said slots being substantially greater than the diameter of said rollers so that a substantial clearance forming an effective fluid reservoir will continually be maintained inwardly of each roller even when each of said rollers is in its inwardmost position;*

*(g) a generally arcuate inlet port formed through one of said circular end walls;*

*(h) a generally arcuate outlet port formed through one of said circular end walls, said arcuate inlet and outlet ports being diametrically opposed and positioned so as to communicate with said slots during rotation of said rotor, and*

*(i) a longitudinal rib dividing each of said inlet and outlet ports into two portions and lying in the same plane of said one circular end wall, said inlet and outlet ports and their respective ribs being positioned so as to communicate with said slots and to provide restraint against lateral displacement of said rollers.*

References Cited by the Examiner

The following references, cited by the Examiner, are of record in the patented file of this patent or the original patent.

UNITED STATES PATENTS

| | | | |
|---|---|---|---|
| 1,466,904 | 9/1923 | Jackson | 103—136 |
| 1,738,345 | 12/1929 | Barlow | 103—136 |
| 1,749,121 | 3/1930 | Barlow | 103—136 |
| 2,392,029 | 1/1946 | Davis | 103—136 |
| 2,393,223 | 1/1946 | Rosen | 103—136 |
| 2,405,061 | 7/1946 | Shaw | 103—126 |
| 2,525,619 | 10/1950 | Roth | 103—137 |
| 2,612,110 | 9/1952 | Delegard | 103—136 |
| 2,660,123 | 11/1953 | Vlachos | 103—136 |
| 2,732,126 | 1/1956 | Smith | 103—111 |
| 3,072,067 | 1/1962 | Beller | 103—136 |

FOREIGN PATENTS 856,687 12/1960 Great Britain.

SAMUEL LEVINE, *Primary Examiner.*

R. M. VARGO, *Assistant Examiner.*